(12) United States Patent  (10) Patent No.: US 6,496,161 B1
Tanaka  (45) Date of Patent: *Dec. 17, 2002

(54) HEAD MOUNT DISPLAY

(75) Inventor: Seiichi Tanaka, Chiba (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,880

(22) Filed: Jan. 7, 1998

(30) Foreign Application Priority Data

Jan. 10, 1997 (JP) ............................................. 9-002715

(51) Int. Cl.⁷ ................................................. G09G 5/00
(52) U.S. Cl. ............................................. 345/8; 345/7
(58) Field of Search ...................... 345/7, 8, 9; 359/630; 349/13; 463/34

(56) References Cited

U.S. PATENT DOCUMENTS

| | | | | |
|---|---|---|---|---|
| 5,392,159 A | * | 2/1995 | Tosaki | 359/633 |
| 5,671,037 A | * | 9/1997 | Ogasawara et al. | 351/158 |
| 5,683,297 A | * | 11/1997 | Raviv et al. | 463/34 |
| 5,742,263 A | * | 4/1998 | Wang et al. | 345/8 |
| 5,767,820 A | * | 6/1998 | Basset e al. | 345/8 |
| 5,796,374 A | * | 8/1998 | Cone et al. | 349/13 |
| 5,812,224 A | * | 9/1998 | Maeda et al. | 349/13 |
| 5,815,126 A | * | 9/1998 | Fan et al. | 345/8 |
| 5,903,395 A | * | 5/1999 | Rallison et al. | 359/630 |
| 5,949,388 A | * | 9/1999 | Atsumi et al. | 345/8 |
| 5,959,597 A | * | 9/1999 | Yamada et al. | 345/8 |
| 5,991,085 A | * | 11/1999 | Rallison et al. | 359/630 |

FOREIGN PATENT DOCUMENTS

JP  A-8086974  4/1996

* cited by examiner

Primary Examiner—Vijay Shankar
(74) Attorney, Agent, or Firm—Birch, Stewart, Kolasch & Birch, LLP

(57) ABSTRACT

The head mount display providing a comfortable fit to the head of the viewer even when the viewer moves his/her head during use comprises a forehead frame supporting two image display means and covering the forehead and the parietal portion of the viewer, a left occipital frame for covering the left occipital portion of the viewer which is movably connected to said forehead frame by a connecting means and supporting one of a signal processing means and one of a sound regeneration means, and a right occipital frame for covering the right occipital portion of the viewer which is movably connected to said forehead frame by a connecting means and supporting the other of the signal processing means and the other of the sound regeneration means.

20 Claims, 8 Drawing Sheets

HEAD MOUNT DISPLAY

BACKGROUND OF THE INVENTION

The present invention relates to a head mount display preferably used in a virtual reality system and the like, and more particularly, to the fitting structure of a head mount display providing a comfortable fit despite the individual difference in the shape of the head.

In recent years, accompanied by the miniaturization of liquid crystal displays, a head mount display (HMD) is being developed, which is mounted on an eyeglasses-shaped case, and is used by mounting onto the head portion of a viewer. At the portion corresponding to the lens of the eyeglasses-shaped case, a back light, a liquid crystal panel and a lens is positioned in this order from the outside. Therefore, by putting on this HMD, the viewer can see an enlarged image of the liquid crystal panel, and can enjoy the image on a wide screen.

In accordance with the fitting structure of the HMD, it is important that the viewer gains a good fit despite the individual difference in the shape of the head. Further, in a HMD for use in accordance with a virtual reality system, the viewer may look around frequently when wearing the HMD, so there is a need for the HMD to provide a good balance when being used, and not to move around when the head of the viewer is moved.

In accordance with such fitting structure of the HMD, an HMD comprising a supporting member of an image indicating device having image indicating elements and an optical system is constituted by a left side supporting portion, a right side supporting portion and a parietal supporting portion, wherein a stable fit is gained by equipping an adjustment member on the left side and right side supporting portion for adjustment of the size according to the size of the viewer's head is proposed in Japanese Laid-Open Patent Publication No. 8-86974.

Generally, in order to gain a good balance when wearing the HMD, it is important to set the center of gravity of the whole weight to the occipital supporting portion. However, in the disclosure of Japanese Laid-Open Patent Publication No. 8-86974, the image display device is held in the front portion of the occipital supporting portion, and the signal processing portion for generating a driving signal of the image indicating elements inside said image indicating device is equipped in the occipital supporting portion, so the center of gravity of the whole weight is in a front portion to the occipital supporting portion, losing balance when used.

Further, it is important for the HMD not to move even when the viewer moves the head during use, and for that purpose, it is better for the HMD to be placed as close as possible to the head portion of the viewer when in use, and the inertial force of the HMD when moving the head portion should not be loaded to the head portion of the viewer. However, in the invention disclosed in the Japanese Patent Application Laid-Open No. H8-86974, the position of the signal processing portion is fixed, and cannot contact the head portion of the viewer, so the HMD moves when the head of the viewer is moved.

The present invention focuses on the above problem, and aims at providing a head mount display with a good balance at the time of use, and the head mount display is prevented of any move even when the head portion of the viewer is moved during use, maintaining a comfortable fit.

SUMMARY OF THE INVENTION

The head mount display of the present invention is a head mount display comprising two image display means for displaying an enlarged image of image display elements to a viewer, two sound regeneration means having sound regeneration elements for regenerating sound, and signal processing means for receiving an image signal and a sound signal from outside and supplying an image display elements driving signal to said image display elements and supplying a sound regeneration elements driving signal to said sound regeneration elements, wherein said head mount display is equipped with a forehead frame for supporting said two image display means and covering the forehead portion and the parietal portion of the viewer, a left occipital frame movably connected to said forehead frame by a connecting means for supporting one of said signal processing means and one of said sound regeneration means and covering the left occipital portion of the viewer, and a right occipital frame movably connected to said forehead frame by a connecting means for supporting the other of said signal processing means and the other of said sound regeneration means and covering the right occipital portion of the viewer.

By the above structure, the head mount display fits to the head portion of the viewer, and the movement of the head mount display is prevented even when the viewer moves his head, maintaining a comfortable fit.

In the head mount display of the present invention, said left occipital frame, said right occipital frame and said signal processing means supported by said left occipital frame and said right occipital frame has a flexible shape so as to support the lower occipital portion along the head portion of the viewer.

By the above structure, the head mount display has a better fit to the head portion of the viewer.

In the head mount display of the present invention, said flexure of said left occipital frame, said right occipital frame and said signal processing means supported by said left occipital frame and said right occipital frame is variable.

By the above structure, the head mount display fits well to the head portion of the viewer even when the size of the head of each viewer differs greatly.

In the head mount display of the present invention, the portion covering the occipital portion of the viewer in said forehead frame is formed to be positioned at the center of gravity of the whole weight.

By the above structure, the balance of the head mount display at use could be improved.

In the head mount display of the present invention, said forehead frame and the connecting means of said left occipital frame and said right occipital frame is formed to add pressure towards the closing direction.

By the above structure, the head mount display is fixed firmly to the head portion of the viewer, preventing movement of the display during use.

In the head mount display of the present invention, a belt for fitting the head mount display to the head portion of the viewer is placed inside said forehead frame connected to said left occipital frame and said right occipital frame, and an adjustment fixing means is further equipped for adjusting the length of said belt at the occipital portion of said viewer.

By the above structure, the temporal portion of the viewer's head could be fixed, and an even better fit of the head mount display could be realized.

PREFERRED EMBODIMENT OF THE INVENTION

Figure 1:
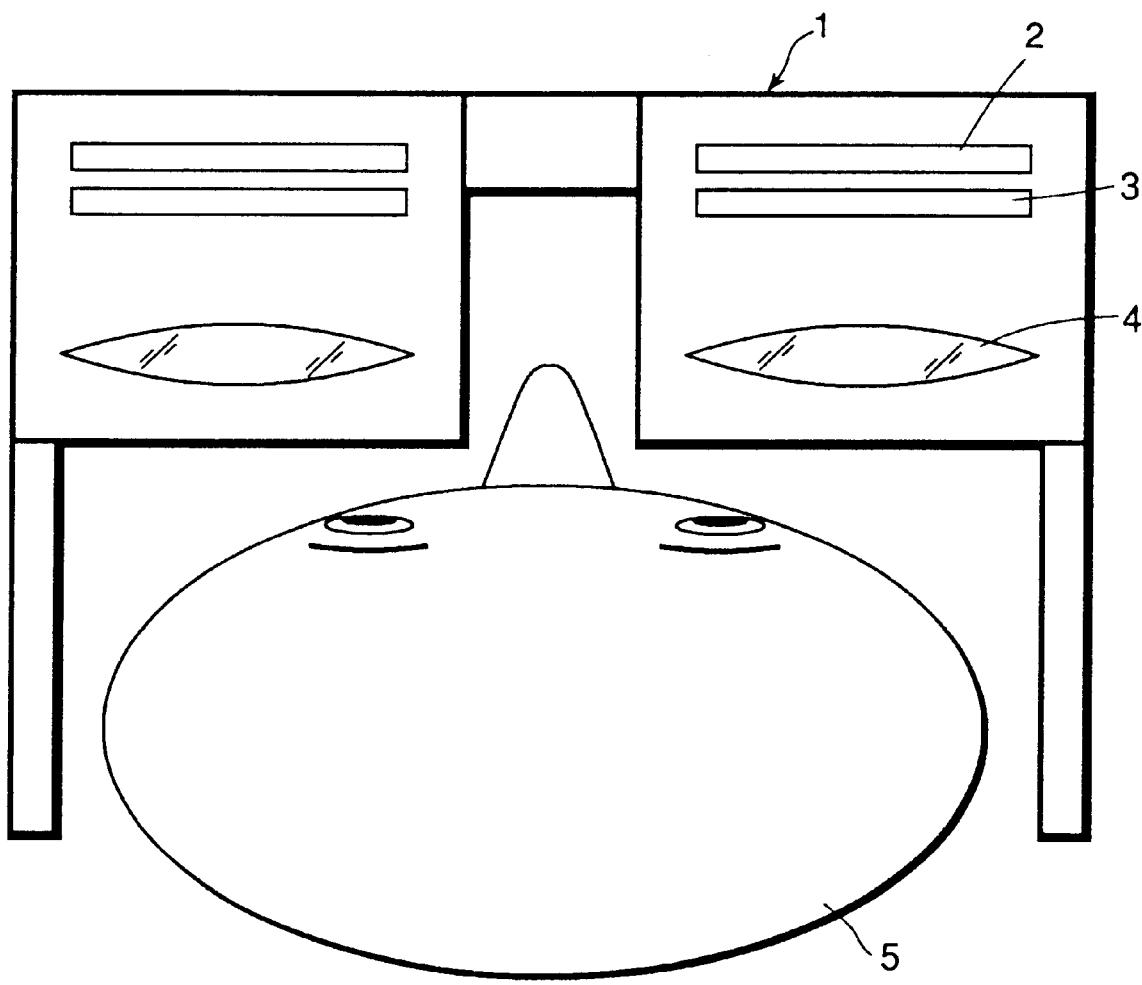
FIG. 1 is an explanatory plan view showing the main structure of the head mount display of the prior art.

In recent years, accompanied by the miniaturization of liquid crystal displays, a head mount display (HMD) having a structure as shown in FIG. 1 is being developed. This HMD is mounted on an eyeglasses-shaped case 1, and it is used by mounting onto the head portion of a viewer 5. At the portion corresponding to the lens of the eyeglasses-shaped case 1, a back light 2, a liquid crystal panel 3 and a lens 4 is positioned in this order from the outside. Therefore, by putting on this HMD, the viewer 5 can see an enlarged image of the liquid crystal panel 3, and can enjoy the image on a wide screen.

Figure 2:
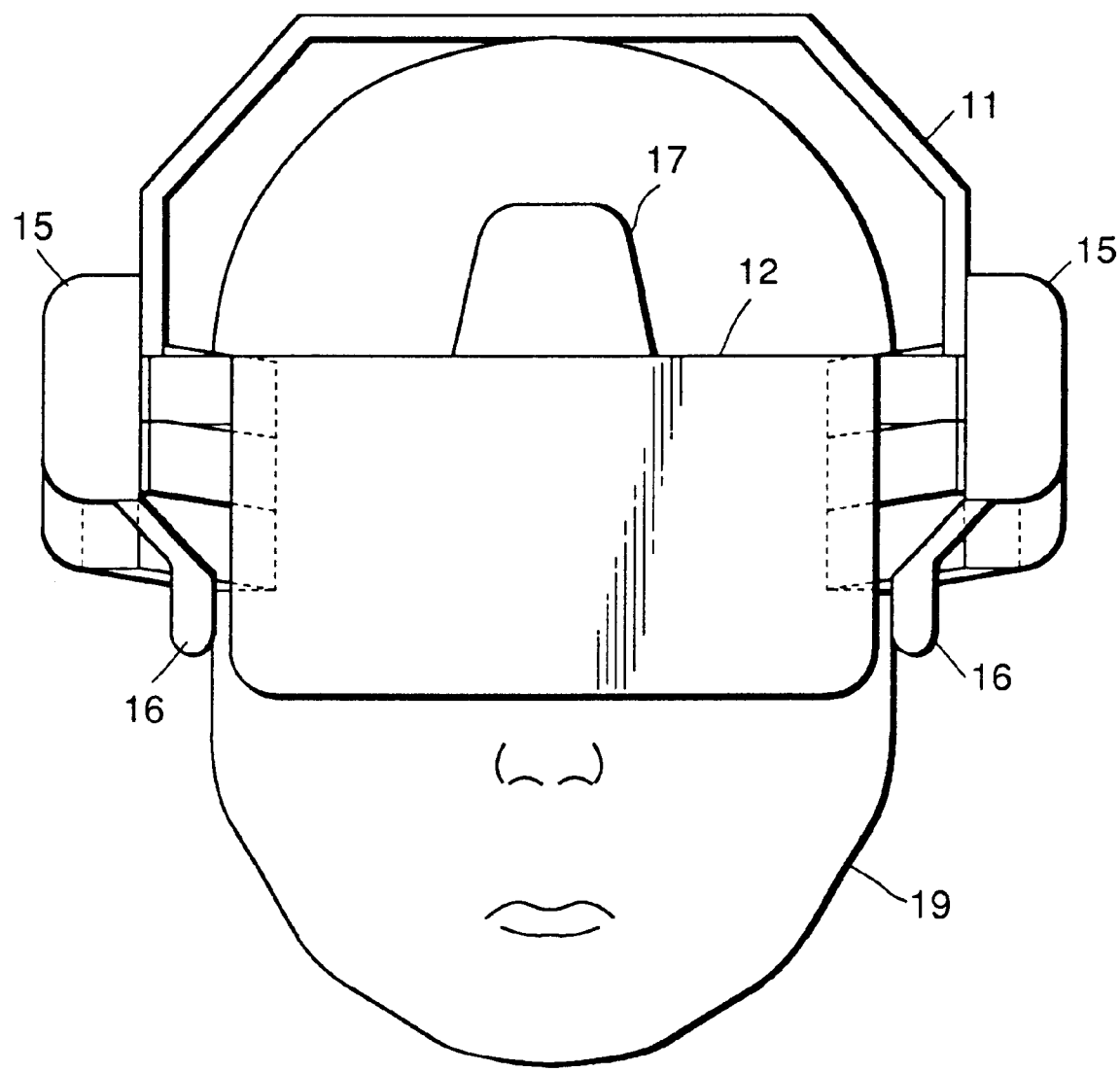
FIG. 2 is an explanatory front view showing the first embodiment of the head mount display according to the present invention.
Figure 3:
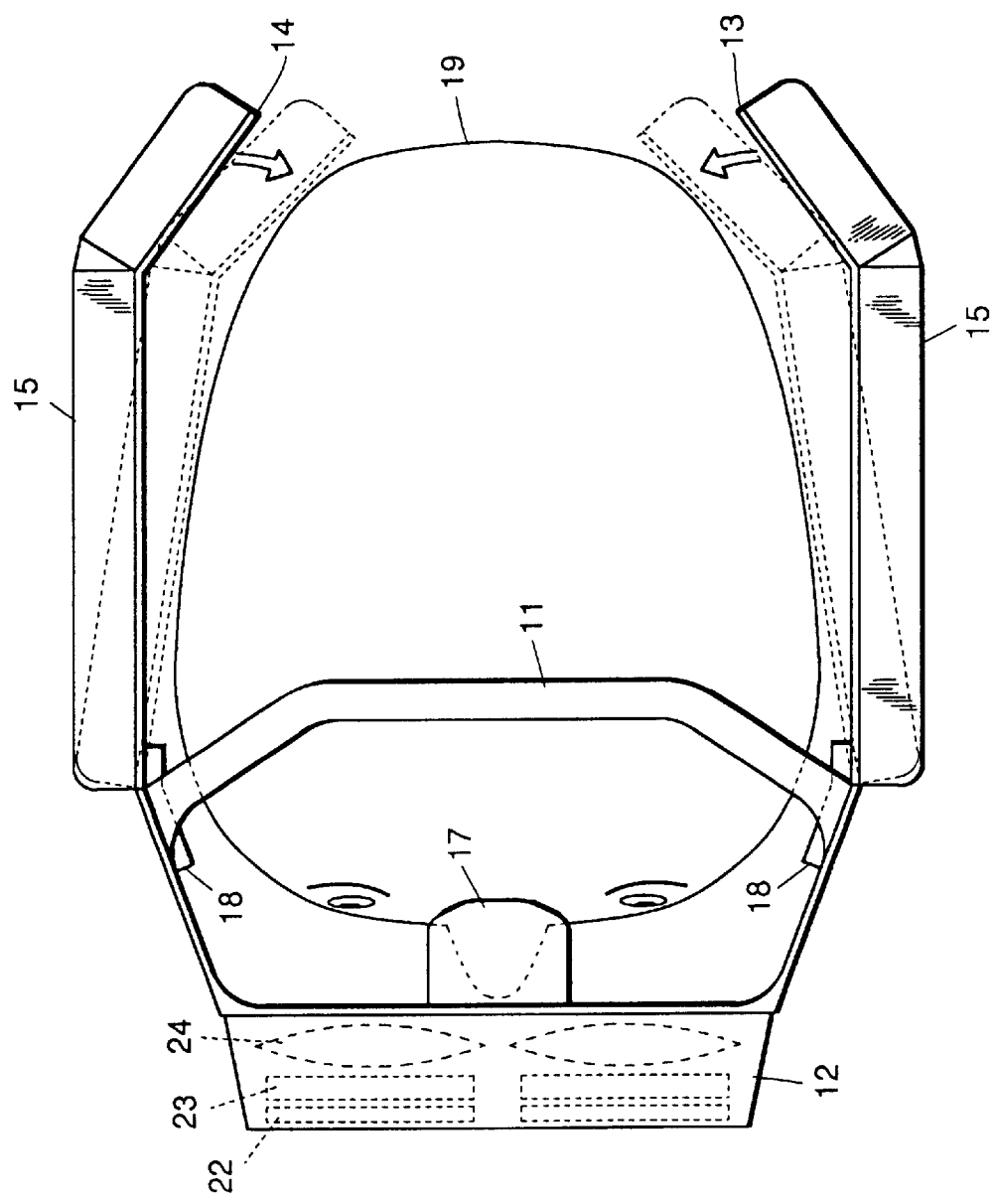
FIG. 3 is an explanatory upper view showing the first embodiment of the head mount display according to the present invention.
Figure 4:
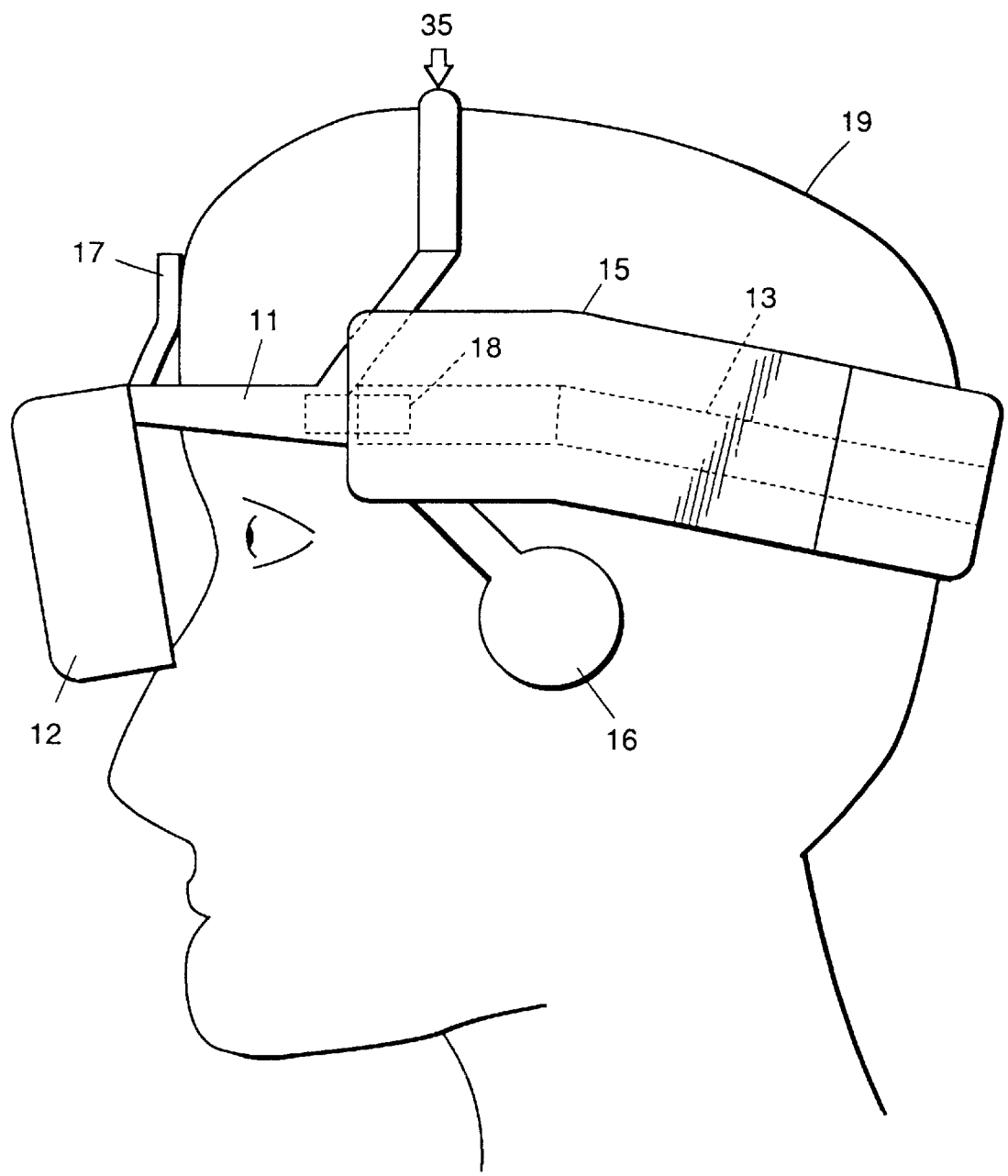
FIG. 4 is an explanatory side view showing the first embodiment of the head mount display according to the present invention.
Figure 5:
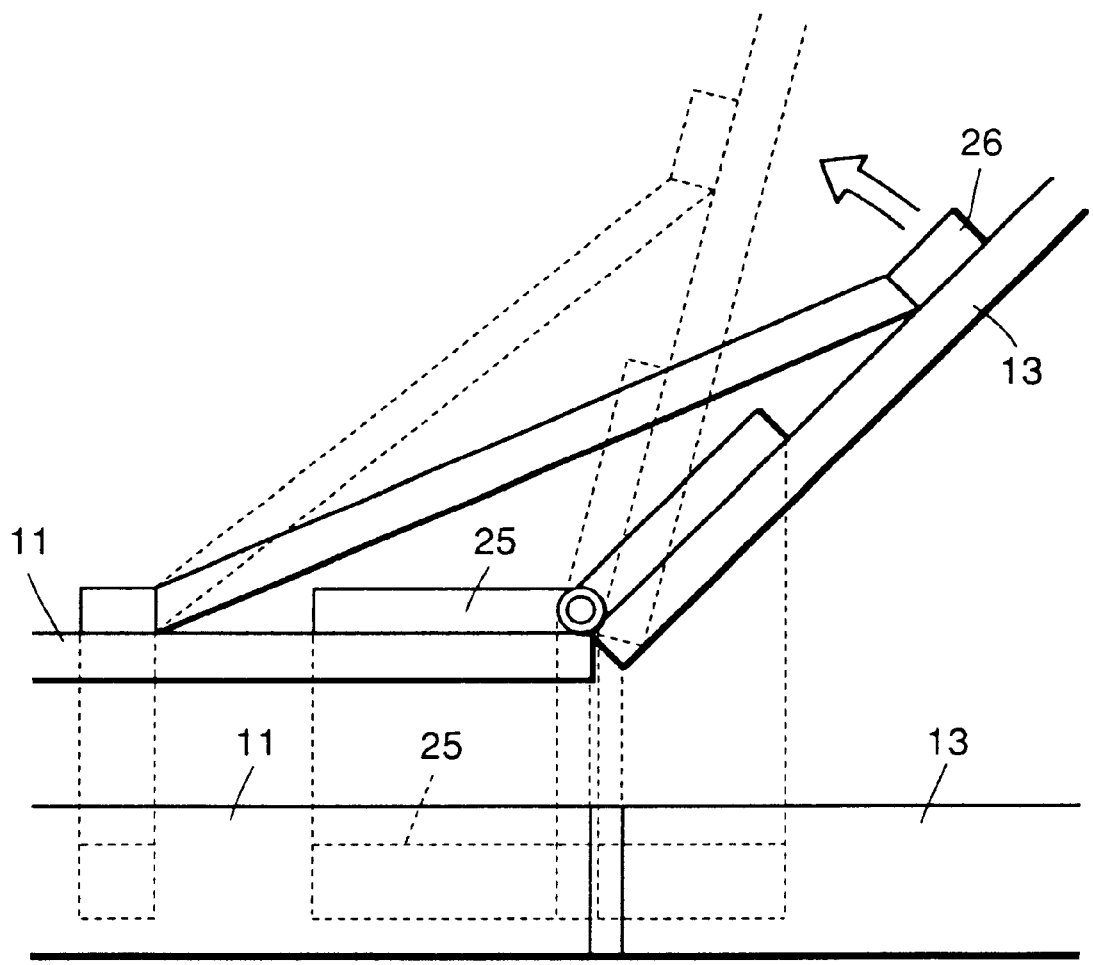
FIG. 5 is an explanatory enlarged view showing the connecting means of the first embodiment of the head mount display according to the present invention.
Figure 6:
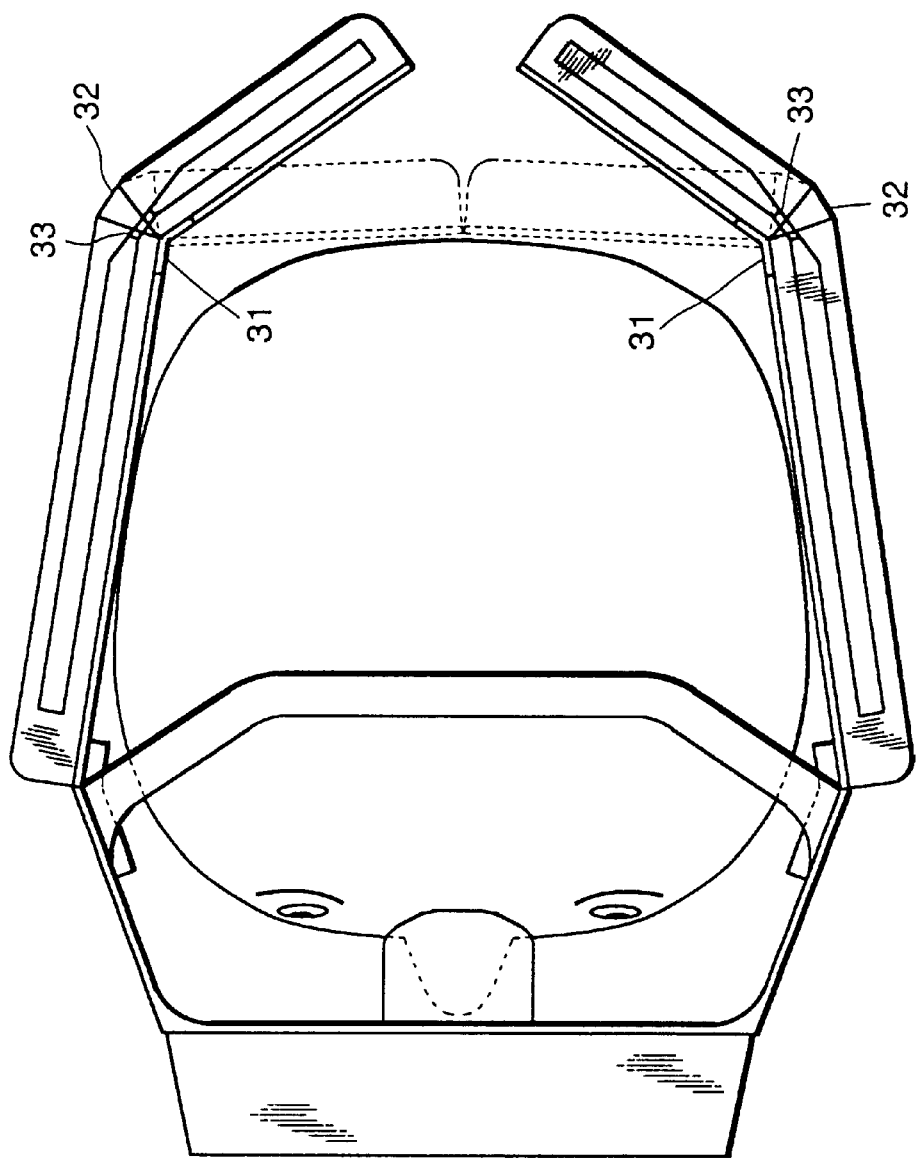
FIG. 6 is an explanatory view showing the flexuous structure of the first embodiment of the head mount display according to the present invention.

The first preferred embodiment of the head mount display of the present invention will hereinafter be explained according to FIGS. 2 through 6. FIG. 2 is an explanatory front view showing the head mount display of the present embodiment, FIG. 3 is an explanatory upper view showing the head mount display of the present embodiment, FIG. 4 is an explanatory side view showing the head mount display of the present embodiment, FIG. 5 is an explanatory enlarged view showing the connecting means in the head mount display of the present embodiment, and FIG. 6 is an explanatory view showing the flexuous structure in the head mount display of the present embodiment.

In the drawings, reference number 11 is a forehead frame, 12 is an image display device, 13 is a left occipital frame, 14 is a right occipital frame, 15 is a signal processing unit, 16 is a headphone, 17 is a forehead pad, 18 is a connecting means, and 19 is a head portion of a viewer.

The forehead frame 11 has an o-shaped frame which covers the forehead to the parietal portion of the viewer, and the forehead frame 11, the left occipital frame 13 and the right occipital frame 14 may be made by a metal material such as aluminum, stainless steel and titanium, or by a resin such as ABS and polystyrene.

The image display device 12 comprises of a back light 22, a liquid crystal panel 23, an optical system 24 such as lenses and concave mirrors for providing an enlarged image of the image on the liquid crystal panel 23 to the viewer, and a case for storing said units.

The signal processing unit 15 comprises of an electric circuit for converting the image signal and the sound signal supplied from the outside to a driving signal of the liquid crystal panel 23 and a driving signal of the headphone 16 and outputting the same, and a case for storing the electric circuit.

In the basic structure of the head mount display (HMD) of the present embodiment, the image display device 12 is positioned in the front portion of the forehead frame 11 so as to be held in front of the eyes of the viewer, and the forehead pad 17 for supporting the HMD is positioned at the forehead portion of the viewer. Said forehead frame 11 is connected at one end to the left occipital frame 13 and at one end to the right occipital frame 14 each supporting a signal processing unit 15 and a headphone 16 through a connecting means 18 which enables an open and close movement.

Further, by the connecting means 18, the left occipital frame 13 and the right occipital frame 14 is connected so as to add pressure towards the closing direction. That is, the connecting means 18 of the present invention connects the forehead frame 11 and the left occipital frame 13 by a hinge 25 which enables an open and close movement, and further connects the two frames by an expansion spring 26, as is shown in FIG. 5. Therefore, the left occipital frame 13 is formed to add pressure to the direction shown by the dotted line of FIG. 5 or, in other words, to the closing direction.

In the same way, the forehead frame 11 and the left occipital frame 13 and the right occipital frame 14 are connected enabling an open and close movement and, at the same time, adding pressure to the closing direction. Therefore, when the viewer puts on the present HMD, the left occipital frame 13 and the right occipital frame 14 fits well and comfortably to the head portion 19 of the viewer regardless of the shape of said head portion 19, and fixed in the position as is shown by the dotted line of FIG. 3.

As a result, even when the viewer moves his/her face while wearing the present HMD, the signal processing unit 15 stays close to the head portion 19 of the viewer, providing a comfortable fit and preventing the moment of inertia.

Further, in the present embodiment, the right occipital frame 14 is designed to have a shape along the shape of the head portion 19 of the viewer with an angled portion which bends toward the lower occipital portion of the head, increasing the area of the left occipital frame 13, the right occipital frame 14 and the signal processing unit 15 which contacts the head portion 19 of the viewer, and at the same time, the left occipital frame 13 and the right occipital frame 14 is positioned so as to oppose to the forehead pad 17, which improves the fit even further.

The shape of a head portion of a human differs greatly according to each individual, and especially, the size of the head differs greatly when comparing a head of a child and that of an adult. When the left occipital frame 13 and the right occipital frame 14 is designed to fit a head portion of an adult, a viewer with a small sized head, such as a child, may not have a comfortable fit of the HMD lacking a proper contact to the head portion, as is shown by the solid line of FIG. 6.

Therefore, in the HMD of the present invention, the left occipital frame 13 and the right occipital frame 14 is formed to be flexuous. In order to realize the variable flexure, for example, a flexible arm could be used at the flexuous portion 31 of the left occipital frame 13 and the right occipital frame 14.

Further, by using a deformable material such as a gum resin in the flexuous portion 32 of the case of the signal processing unit 15 supported by the left occipital frame 13 and the right occipital frame 14 and positioning a cable to a flexuous portion 33 of the electric circuit stored inside the case, the left occipital frame 13, the right occipital frame 14 and the signal processing unit 15 could all have the same flexure.

By the above structure, the left occipital frame 13 and the right occipital frame 14 could be bent to the position shown by the dotted line of FIG. 6 even when the size of the head of the viewer differs greatly, providing a comfortable fit to the head.

Even further, by the structure of the present embodiment, the image display device 12 is positioned in the front direction and the signal processing unit 15 is positioned in the back direction with a parietal support portion 35 of the forehead frame 11 at the center, which enables to easily design the center of gravity of the whole weight of the present HMD to be positioned at the parietal support portion 35.

Setting the center of gravity of the whole weight of the HMD at the parietal support portion 35 is important in keeping the balance and improving the comfortable fit of the HMD when in use, and the present embodiment enables to design the HMD to have such characters.

The method of wearing the HMD according to the present embodiment is performed by the operation as follows. The viewer holds the signal processing units 15 by both hands, opens the left occipital frame 13 and the right occipital frame 14 and places them to his/her head portion 19. After positioning the HMD to the head portion 19 and releasing hold of the HMD, the forehead pad 17, the left occipital frame 13, the right occipital frame 13 and the signal processing units 15 each supported by the occipital frames is positioned so as to contact the head portion 19, and wearing of the HMD is completed.

Figure 7:
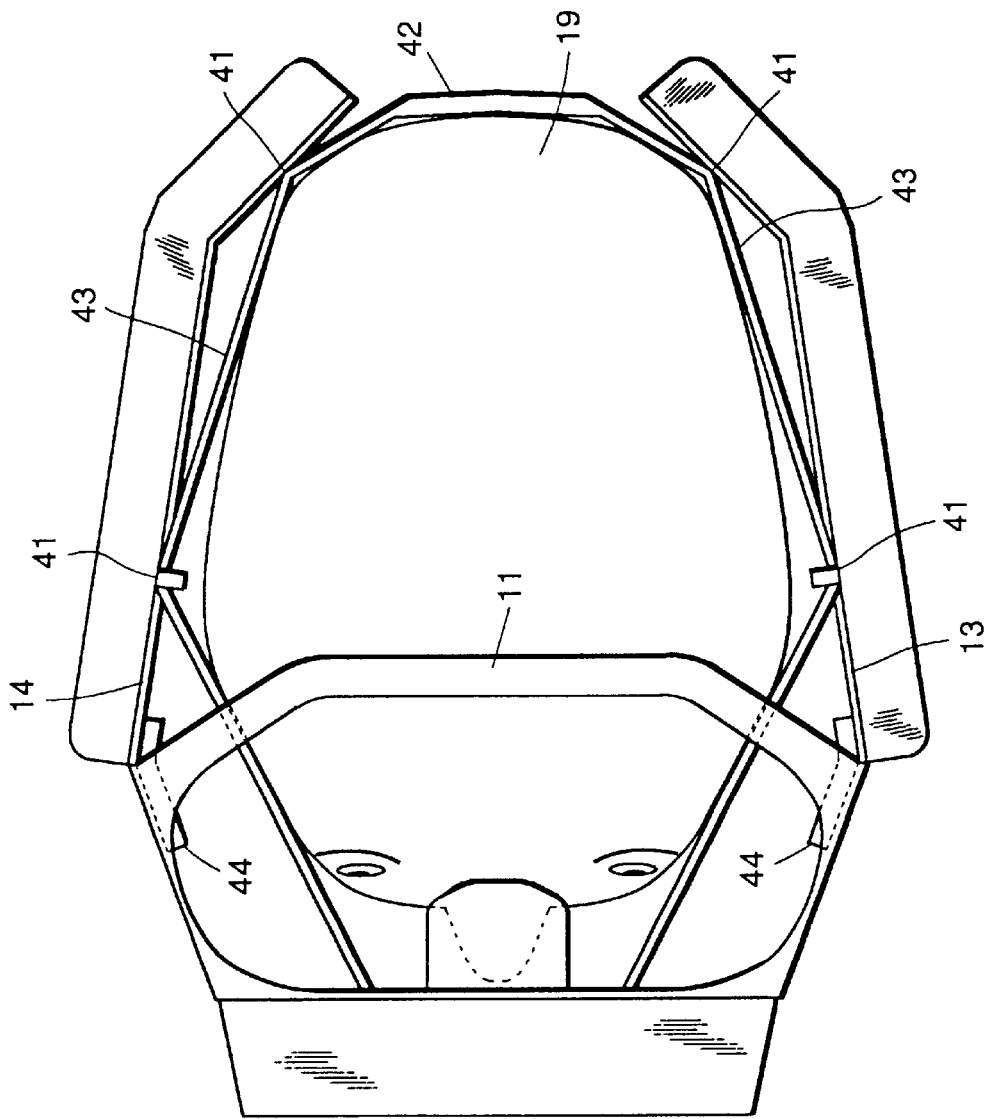
FIG. 7 is an explanatory upper view showing the second embodiment of the head mount display according to the present invention.

Next, the second embodiment of the head mount display of the present invention will be explained with reference to FIGS. 7 and 8. The equivalent portion to said first embodiment is provided with the same reference number, and the explanation of the same will be omitted. FIG. 7 is an upper explanatory view showing the head mount display of the present embodiment, and FIG. 8 is an enlarged explanatory view showing the connecting structure of a frame and a belt of the head mount display of the present embodiment.

In the HMD of the present embodiment, the point that differs from the first embodiment is that the forehead frame 11 is connected at its inner side to the left occipital frame 13 and the right occipital frame 14 by a connecting ring 41 with a belt 43 comprising an expansion portion 42 enabling expansion at the occipital portion of the viewer, and that a connecting means 44 is provided with a structure enabling an open and close movement without the structure to add pressure to the closing direction.

Figure 8:
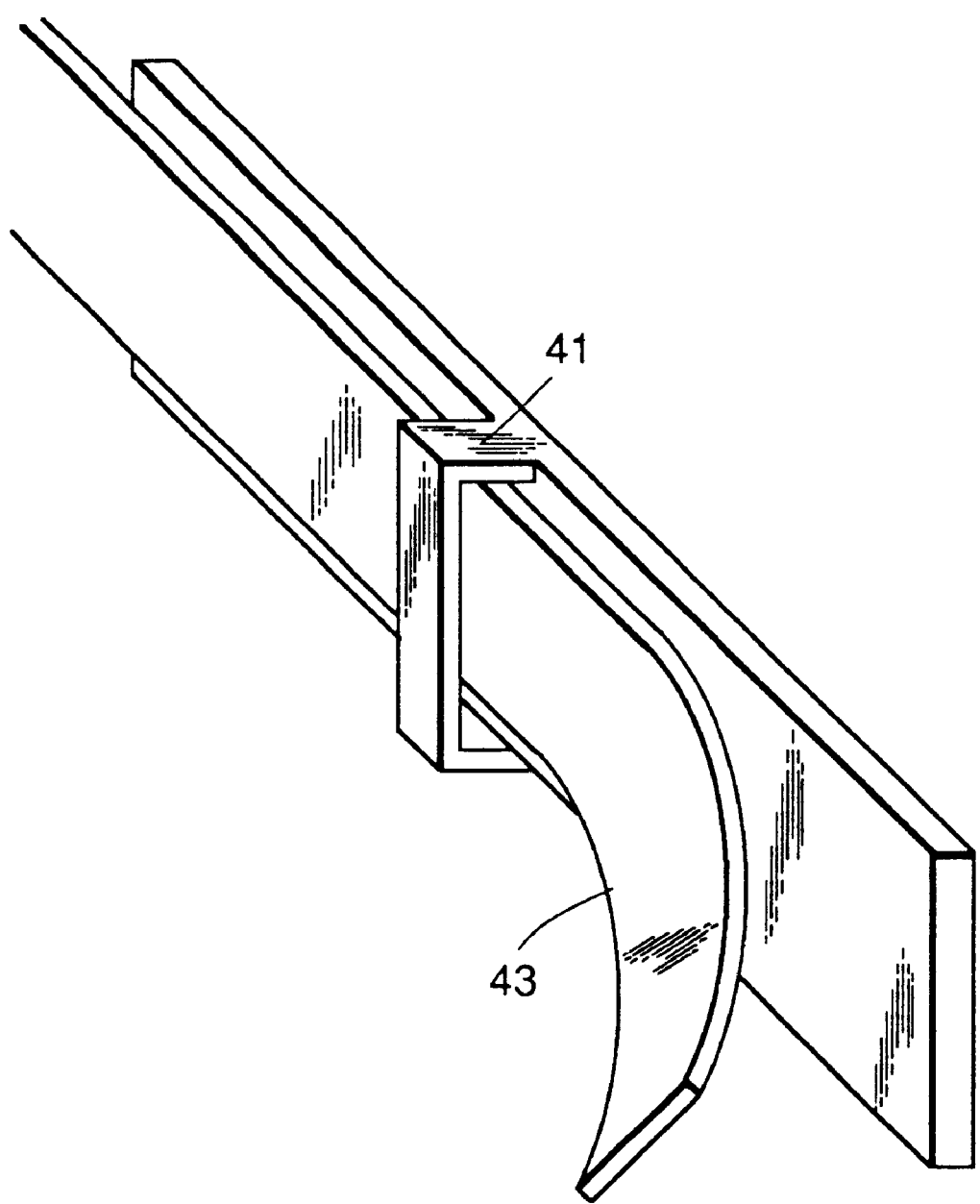
FIG. 8 is an explanatory enlarged view showing the connecting structure of the frame and the belt in the second embodiment of the head mount display according to the present invention.

The connection between the belt 43 and the left and right occipital frames 13, 14 is formed to have a structure as shown in FIG. 8 wherein the belt 43 is inserted through the connecting rings 41 formed on the left occipital frame 13 and the right occipital frame 14. Said connecting rings 41 are formed on two positions of each of the left occipital frame 13 and the right occipital frame 14.

Therefore, by opening the left occipital frame 13 and the right occipital frame 14, the expansion portion 42 of the belt 43 expands, adding a pressure towards the closing direction to the left occipital frame 13 and the right occipital frame 14. In most cases, the expansion portion 42 is designed so that the length of the belt 43 is smaller than the size of the head portion 19.

In order to wear the HMD of the present embodiment, the viewer holds the signal processing units 15 by both hands, opens the left occipital frame 13 and the right occipital frame 14 and places them to his/her head portion 19. After positioning the HMD to the head portion 19 and releasing hold of the HMD, the belt 43 winds around the head portion 19, and at the same time, the left occipital frame 13, the right occipital frame 14 and the signal processing units 15 each supported by the occipital frames is positioned so as to contact the head portion 19, and wearing of the HMD is completed.

By adopting a belt such as the one in the present embodiment, the HMD could be fixed to the temporal portion of the viewer, and an even better fit of the HMD could be realized.

The head mount display according to claim 1 of the present invention fits comfortably to the head of the viewer, and the fit is maintained even when the viewer moves his/her head during use.

The head mount display according to claim 2 of the present invention provides an even better fit to the head of the viewer.

The head mount display according to claim 3 of the present invention fits comfortably to the head of the viewer regardless of the difference in size of the head of each viewer.

The head mount display according to claim 4 of the present invention enables improvement of the balance of the head mount display during use.

The head mount display according to claim 5 of the present invention provides a firm fit to the head of the viewer, reducing movement during use.

The head mount display according to claim 6 of the present invention could be fixed to the temporal portion of the viewer, enabling an even firm fit.

What is claimed is:

1. A head mount display, comprising:
    a left image display device for displaying an enlarged image of image display elements to a viewer;
    a right image display device for displaying an enlarged image of image display elements to a viewer;
    a left sound regeneration device having sound regeneration elements for regenerating sound;a
    right sound regeneration device having sound regeneration elements for regenerating sound;
    left and right signal processing units for receiving an image signal and a sound signal from outside, for supplying an image driving signal to said image display elements and for supplying a sound driving signal to said sound regeneration elements;
    a forehead frame for supporting said left and right image display devices and covering forehead and parietal portions of the viewer;
    a left occipital frame connected to said forehead frame so as to be moveable in a forward and rearward direction with respect to the viewer's head by a connecting means for supporting said signal processing unit and said left sound regeneration device, and for covering the left occipital portion of the viewer; and
    a right occipital frame connected to said forehead frame so as to be moveable in a forward and rearward direction with respect to the viewer's head by a connecting means for supporting said signal processing unit and said right sound regeneration device, and for covering the right occipital portion of the viewer;
    said left and right signal processing units are supported by said left and right occipital frame respectively; and said left and right occipital frames have a shape so that they are effective to contact the sides and back of a users head.

2. A head mount display according to claim 1, wherein said left and right occipital frames are flexible so as to support the lower occipital portion along the head of the viewer.

3. A head mount display according to claim 2, wherein flexure of said left and right occipital frames is variable.

4. A head mount display according to claim 1, wherein the portion covering the pariental portion of the viewer in said forehead frame is formed to be positioned at the center of gravity of the whole weight.

5. A head mount display according to claim 1, wherein said forehead frame and said connecting means for said left and right occipital frames are formed to add pressure toward the closing direction.

6. A head mount display according to any of claims 1 through 5, further comprising:
   a belt for fitting the head mount display to the head portion of the viewer, which is placed inside said forehead frame and which is connected to said left and right occipital frames; and
   an adjustment fixing device for adjusting length of said belt at the occipital portion of said viewer.

7. The head mount display of claim 1, wherein said left and right signal processing units form part of said left and right occipital frames respectively and conform to the shape of the viewer's head.

8. The head mount display of claim 5, wherein said connecting means further includes a hinge and a spring for connecting each of said left and right occipital frames to said forehead frame, wherein said hinge and spring orients said left and right occipital frames to exert pressure in a closing direction towards the viewer's head.

9. A head mount display, comprising:
   a forehead frame for supporting left and right image displays, said forehead frame effective to cover the forehead and parietal portions of a viewer's head;
   a left occipital frame connected to said forehead frame so as to be moveable in a forward and rearward direction with respect to the viewer's head for covering the left occipital portion of the viewer, wherein said left occipital frame supports a left sound regeneration device and is enshrouded by a built-in left signal processing unit connected thereto; and
   a right occipital frame connected to said forehead frame so as to be moveable in a forward and rearward direction with respect to the viewer's head and effective for covering the right occipital portion of the viewer, wherein said right occipital frame supports a right sound regeneration device and is enshrouded by a built-in right signal processing unit connected thereto, wherein the right and left occipital frames are shaped so as to contact the sides and back of a viewer's head.

10. The head mount display of claim 9, wherein said left and right image displays display an enlarged image of image display elements to a viewer; and said left and right sound regeneration devices include sound regeneration elements for regenerating sound.

11. The head mount display of claim 10, wherein said left and right signal processor units receive image signals and sound signals from an outside source; and supply image driving signals and sound driving signals to said respective image display and sound regeneration elements.

12. The head mount display of claim 9, wherein said left and right occipital frames and said signal processing units thereon conform to the shape of the viewer's head.

13. The head mount display of claim 9, further including a hinge and a spring for connecting each of said left and right occipital frames to said forehead frame, wherein said hinge and spring orients said left and right occipital frames to exert pressure in a closing direction towards the viewer's head.

14. A head mount display, comprising:
   a forehead frame for supporting left and right image displays, said forehead frame effective to cover the forehead and parietal portions of a viewer's head;
   a left occipital frame connected to said forehead frame so as to be moveable in a forward and rearward direction with respect to the viewer's head for covering the left occipital portion of the viewer, wherein said left occipital frame supports a left sound regeneration device and is enshrouded by a built-in left signal processing unit connected thereto; and
   a parietal support portion operatively connected to the head mount display at a position, so that the center of gravity of the head mount display is at the parietal support portion.

15. The head mount display according to claim 1, wherein the left and right occipital frames each one having an outside and inner surface extending in a longitudinal direction from the forehead, frame, and the left and right processing units substantially cover and are in physical contact with the left and right outside surfaces of the left and right occipital frames, respectively.

16. The head mount display according to claim 9, wherein the left and right occipital frames each one having an outside and inner surface extending in a longitudinal direction from the forehead frame, and the left and right processing units substantially cover and are in physical contact with the left and right outside surfaces of the left and right occipital frames, respectively.

17. The head mount display according to claim 14, wherein the left sound regeneration device covers an outside surface of the left occipital frame.

18. The head mount display according to claim 1, wherein the connecting means connects the forehead frame and the left occipital frame by a hinge and a spring.

19. The head mount display according to claim 18, wherein the connecting means connects the forehead frame and the right occipital frame by a hinge and a spring.

20. The head mount display according to claim 1, wherein the right and left occipital frames each have a bent portion at their ends.

* * * * *